United States Patent [19]
Aoki et al.

[11] 4,101,133
[45] Jul. 18, 1978

[54] PICKUP TONE ARM

[75] Inventors: Naohisa Aoki; Hitoshi Matsuda; Hideaki Hayashi, all of Mitaka, Japan

[73] Assignee: Nippon Columbia Kabushikikaisha (Nippon Columbia Co., Ltd.), Tokyo, Japan

[21] Appl. No.: 731,666

[22] Filed: Oct. 13, 1976

[30] Foreign Application Priority Data

Oct. 16, 1975 [JP] Japan .............................. 50-141086
Feb. 24, 1976 [JP] Japan .............................. 51-20708

[51] Int. Cl.² ............................................. G11B 3/18
[52] U.S. Cl. ................................................. 274/23 R
[58] Field of Search ..................................... 274/23 R

[56] References Cited

U.S. PATENT DOCUMENTS 2,357,034 8/1944 Thompson et al. ................ 274/23 R
3,649,031 3/1972 Templin ............................. 274/23 R

FOREIGN PATENT DOCUMENTS 2,337,431 2/1975 Fed. Rep. of Germany ..... 274/23 R

*Primary Examiner*—Charles E. Phillips
*Attorney, Agent, or Firm*—Hill, Gross, Simpson, Van Santen, Steadman, Chiara & Simpson

[57] ABSTRACT

This invention relates to a complex resonance type pickup tone arm in which a damping member is disposed at the middle of the arm to damp low and middle frequency resonances so that the tip of the arm is prevented from being bent down.

10 Claims, 20 Drawing Figures

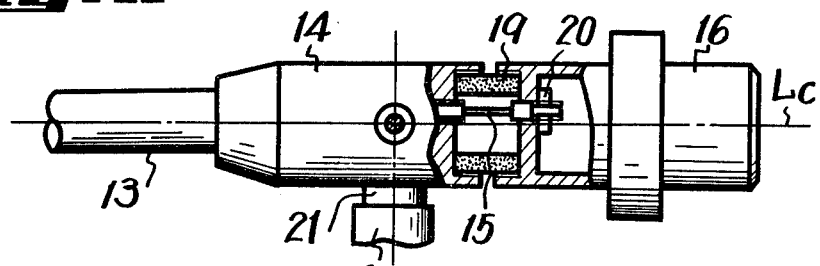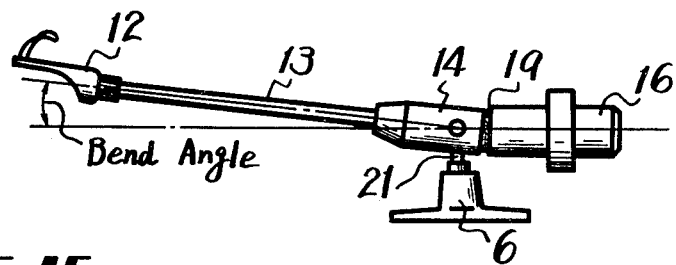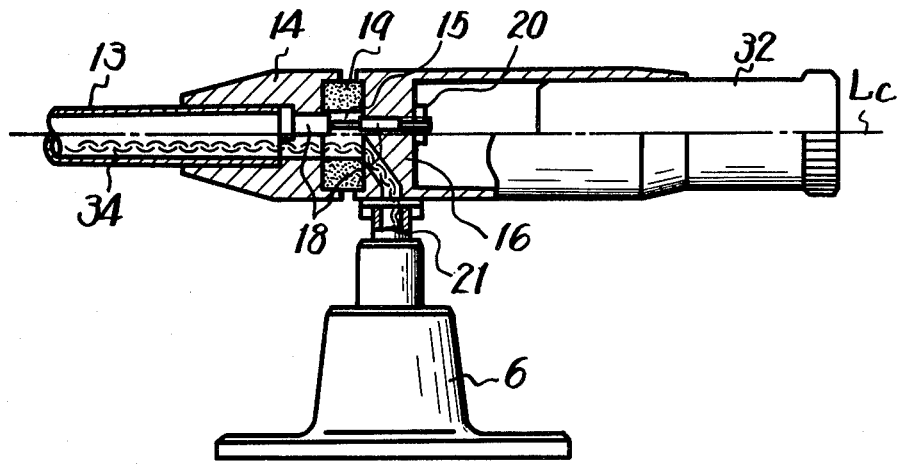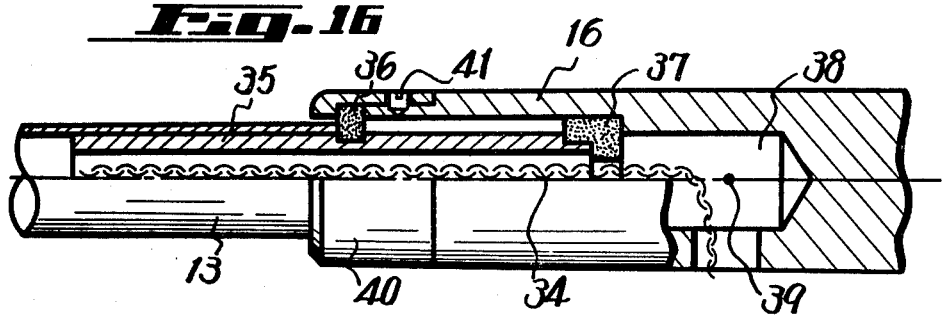

PICKUP TONE ARM

BACKGROUND OF THE INVENTION

1. Field of the Invention

This invention relates to a pickup tone arm of a record player and particularly to a pickup tone arm which can simultaneously improve a low frequency range resonance (hereinafter referred to as a low resonance) $f_l$ caused by the compliance of a stylus of a pickup cartridge and the equivalent mass of a tone arm and a middle frequency range resonance (hereinafter referred to as a middle resonance) $f_m$ of the tone arm itself thereby preventing the bend down of a complex resonance type pickup tone arm which is divided in plural sections with a damping member being disposed in the tone arm.

2. Description of the Prior Art

Recently, for enhancing the compliance of a pickup cartridge, the low resonance $f_l$ of a pipe-type tone arm has been a lower frequency range such as 4 to 12 $H_z$ and the peak level at its resonance frequency has been quite high, for example, 10 to 15 dB as compared with the normal level. In addition, a record disc itself has eccentricity, warp and so on, so that when the record disc is reproduced, wow is caused whose frequency is rather high as compared with the resonance frequency $f_l$. It is also known that the lower frequency limit of an audio frequency band at its reproduction can be selected as about 20 $H_z$. Nowadays, therefore, as the compliance of the pickup cartridge becomes higher the low resonance $f_l$ is designed to be selected not in a range of 4 to 12 $H_z$ but at a frequency lower than or equal to 20 $H_z$.

Now, in order to increase the compliance of a tone arm, consideration will be given to the case where a record disc having warp equivalent to, for example, more than 6 $H_z$ is faithfully traced by means of a pickup cartridge tone arm having a low resonance of about 6 $H_z$. In this case, the tone arm can not follow the record disc having such a warp since the frequency band higher than 6 $H_z$ becomes difficult to follow. so that the vibration system of a cantilever including a stylus of the pickup cartridge follows the warp of the record disc equivalent to 6 $H_z$ to which deteriorates its sound quality, because it contains a warp component.

As a condition of increasing the compliance of the pickup cartridge, the equivalent mass of the tone arm viewing from its stylus is made small. However, when the tone arm is designed light in weight for the above purpose, it is limited naturally from a view point of mechanical strength of the tone arm itself. Further, even though the low resonance is selected in a range between 15 and 20 $H_z$ outside the frequency band where there are a lot of scattered frequency components of warp, eccentricity or the like of the record disc, the resonance peak is still present, so that a low frequency component in the vicinity thereof is included in a musical sound of a record source or in its envelope. When the tone arm receives an external vibration energy of the same frequency as that of low frequency components in the musical sound, it vibrates resonance. The higher the value of Q, the stronger becomes the vibration and hence the stylus of the pickup cartridge is moved substantially. Thus, a frequency component higher than $f_l$ will be modulated so that an effect which deteriorates the quality of reproduced sound is further increased. As a result, if a condition where the resonance peak is not damped as shown by a curve (a) in frequency-response characteristics of FIG. 1 can be changed to a condition where the same is subjected to critical damping as shown by a curve (b) and the low resonance $f_l$ or a so-called cut-off frequency can be established at an optimum position, the problems as described above will be solved.

In the prior art, as a means for damping the low resonant frequency a device utilizes viscous resistance such as oil or the like in its bearing portion. In this case, however, since the reproducing band extends to a frequency lower than the cut-off frequency or lower than 5 $H_z$ in FIG. 1 and there occurs a problem of compliance ability for warp, eccentricity or the like of the record disc, the pickup cartridge vibrating system receives DC displacement and sometimes with a biasing force much exceeding the inside force at the record play time, so that the quality of the reproduced sound from the record disc may be badly affected.

In order to achieve the same purpose as described above, there has been proposed a damper device utilizing anti-resonance as shown in FIG. 2, wherein a balance weight 2 is attached through a resilient coupler 3 to the rear end of a tone arm 1 which is pivotally mounted on a base 6. In this device, if the complicance of the pickup cartridge is not properly selected, its frequency-response characteristic is shown by a dotted-line curve (4) in FIG. 3 wherein the response of one peak resonance frequency becomes higher than the other and it is very difficult to obtain responses at two peak resonance frequencies which are equal as shown by a full-line curve (5) in FIG. 3. Therefore, there are drawbacks that the functional property of a universal tone arm is absent and mechanical vibrations from the base 6 are greatly applied to the arm.

Further, the prior art tone arm has another problem of the so-called middle resonance according to the resonance of a pipe, other mechanisms and the like. It has been found that the greatest middle resonance exists normally in a range between 50 and 200 $H_z$ and many other middle resonances are scattered over the wide range according to the difference of structures or the like.

In a normal device for measuring the middle resonance by using a frequency characteristics measuring record disc, a damper of high compliance is coupled between the pickup cartridge stylus and the tone arm, that is, a mechanical filter of very low cut-off frequency is considered to be interposed therebetween in this case, so that the vibrating energy applied to the tone arm is not enough to excite it and hence the middle resonance does not appear substantially in the frequency characteristics. However, when the tone arm 1 is driven from the side of the base 6, the middle response is greatly affected.

In FIG. 4, an exciter device 7 is arranged at the side of the base 6 of the tone arm 1. This exciter device 7 is energized by an oscillating frequency of an oscillator 8 and a signal from a detector 9 is applied to a recorder 10 for recording so that the frequency-response characteristics are obtained as shown in FIG. 5 by a curve (11). Accordingly, when the tone arm is assembled as a unit of the record player, upon playing a record a sound energy from a loudspeaker is fed back through a player cabinet from the base 6 to the tone arm 1 to excite the tone arm main holder or directly the tone arm 1 itself. Therefore, the tone arm 1 becomes resonant to deteriorate the reproduced sound quality, and when the record player or the like is touched with by hand, noise or howl is produced. One of the great causes for producing the above noise or howl is this effects the middle resonance.

One embodiment for providing a tone arm capable of improving the low and middle resonances simultaneously will next be described with reference to FIG. 6. In FIG. 6, reference numeral 12 designates a stylus of the pickup cartridge and 13 a pipe portion of an aluminium arm. The end portion of the pipe 13 is fixed to a cylindrical holder 14 and one end 14a of the holder 14 is connected to one end of a suspension wire 15 made of a piano wire, high polymer material or the like passing through the center of the holder 14.

The other end of the suspension wire 15 is fixed to one end of a pipe holder 18 which is inserted in a bore 17 provided at the center of a tone arm main holder 16. Between the holder 14 and the tone arm main holder 16 is interposed a damper member 19 made of visco-elastic material or the like. After being adjusted at an optimum position, the pipe holder 18 is secured thereto by adhesive material, a set screw 20 or the like.

With the construction of the tone arm as described above, the tone arm main holder 16 and the pickup cartridge pipe 13 are isolated from each other in a vibratory manner with the damper 19 being interposed therebetween so that the tone arm may have the same elasticity and viscosity in every direction over an angular range of 360° in a universal joint manner with the position of the suspension wire 15 inserted in the center of the damper 19 being set as a fulcrum. In this case, however, the tone arm will not move in a front-rear direction, that is, the axial direction of the pipe 13 by means of the suspension wire 15. In this construction, it is noticed preferable that, as shown in FIG. 6, the damper 19 is disposed at the pickup cartridge side of the tone arm within substantially 50 mm of the distance L from the shaft 21 of the base 6 to form the complex resonance system vibration fulcrum.

A description will next be given of an operation theory of the above-mentioned construction. The above construction can be illustrated by an electrical equivalent circuit as shown in FIG. 7. In the equivalent circuit of FIG. 7, $s_r$ and $r_r$ denote respectively an equivalent stiffness and equivalent resistance which show elasticity and loss of the record disc, and $m_c$, $s_c$ and $r_c$ represent respectively an equivalent mass of the pickup cartridge vibration system and an equivalent stiffness and equivalent resistance of the damper of the vibration system holding portion. Further, $m_{t1}$ designates an equivalent mass of the complex resonance system vibration fulcrum including the pickup cartridge, that is, of the pickup cartridge side portion from the damper 19, $s_t$ and $r_t$ respectively an equivalent stiffness and equivalent resistance of the complex resonance system fulcrum and $m_{t2}$ and $m_{t3}$ respectively equivalent masses of the portions of the tone arm main holder 16 excepting the equivalent mass $m_{t1}$, $r_p$ an equivalent resistance of the pivotal portion of the tone arm fulcrum, $v$ a sound groove speed amplitude of the record disc and $z_m$ a mechanical impedance looking from the record stylus, respectively.

In the proposed low frequency sound range, $m_c$, $s_r$ and $r_r$ can be considered negligible, so that the equivalent circuit of FIG. 7 can be approximated to an equivalent circuit of FIG. 8. Assumed that relations $s_c < s_t$ and $r_c < r_t$ are satisfied in the equivalent circuit of FIG. 8, a frequency $f_1$ of a resonance circuit consisting of $m_{t1}$, $s_c$ and $s_t$ and a frequency $f_2$ of a resonance circuit consisting of $s_c$, $m_{t1}$ and $m_{t2,3}$ are established with a condition of $f_1 > f_2$. The frequency-response characteristics for the above is shown by a curve (23) in FIG. 9 and the low frequency characteristics of the prior art tone arm is shown by a curve (24) in FIG. 9.

According to the tone arm as mentioned above, there is an advantage that the complex resonance frequencies $f_1$ and $f_2$, that is, the low resonance $f_1$ can keep the value of Q low and the level at the lower resonance frequency $f_2$ can be desirably kept low. Further, the effect for the above tone arm is substantially independent of the amount of compliance of the pickup cartridge and the optimum value thereof can also be selected according to the value of the compliance. In addition, there is used a method of adjusting its damping function by changing the aforesaid $s_t$ and $r_t$ of the complex resonance system fulcrum. Similarly in the case of the middle resonance $f_m$, a resistance component is inserted between the stylus and the tone arm rear portion thereby to damp the resonance produced therebetween. Particularly, when an external vibration is transmitted from the arm base, the above tone arm is quite effective, and in the case of record reproduction it is also effective for the prevention of howling or the like.

As frequently seen in a prior art tone arm as shown in FIG. 10, where a visco-elastic material 25 is disposed at the side of the rear weight portion, the vibration frequency characteristic thereof is shown in FIG. 5 by a curve (26). As compared with the above described tone arm with its characteristic curve (27), a big difference was found therebetween. A pickup device with a visco-elastic material 28 being inserted in the middle of a tone arm pipe as shown in FIG. 11 has already been disclosed in The AES, 1963, 6 Vol. 11 No. 3 by Mr. B. B. Bauer of USA. However, in the case of high compliance such as the recent pickup cartridge, if the compliance of the visco-elastic material inserted in the middle of the pipe or the like is not increased, no effect appears resulting in poor utility.

Another embodiment of this construction will be described in detail with reference to FIG. 12 in which elements corresponding to those of FIG. 6 are shown by the same reference numerals with their description being omitted. This pickup cartridge device is provided with a damping adjustable mechanism or the like which can adjust the damping function in conformity with the compliance of the pickup cartridge. That is, the pipe holder 14 is provided at its center with a bore 14c into which the tone arm pipe 13 is inserted and secured to the holder 14 by a set screw 33. The suspension wire 15 provided in the central bore of the damper 19 is fixed at its one end to a first suspension holder 14b and at its other end to a second suspension holder 18 which is inserted into the bore 17 of the tone arm main holder 16. A lead wire 34 from the cartridge is passed through the central aperture of the damper 19 for stretching the pipe 13 and penetrates through the base 6. Also, a balancing weight 29 is disposed on the tone arm main holder 16 in an axially slidable manner. The main holder 16 has bored therein a facing aperture 30 into which is inserted a damping control rotary knob 32 formed substantially in a screw type. The damping control rotary knob 32 is provided at its top end 32a with an internal thread 32b to which is engaged a screw formed about the top end of the second suspension wire 18. Thus, the damping control rotary knob 32 is connected to the suspension wire 15, the pipe 13 and the like. In FIG. 12, 31 designates a rotary knob stopper. With the construction as mentioned above, the damping can be adjusted by rotating the knob 32 which is quite effective for the low and middle resonances $f_l$ and $f_m$ with the result that the sound quality is greatly improved upon reproducing a record disc.

In the respective constructions as described above, since the suspension wire 15 is stretched between the pipe 13 and the balance weight (the main holder portion) 16 at their axial center, the damper 19 is applied with an objective pressure to maintain the tone arm pipe 13 and main holder 16 so as not to be bent or hang down. However, unless the visco-elestic material to be used is relatively hard, it is bent or hangs down as mentioned above. For this reason, the suspension wire 15 is usually applied with a relatively large tension. However, such an arrangement will tend to lessen the effect in that the visco-elastic material is interposed to provide a filter effect.

SUMMARY OF THE INVENTION

It is an object of this invention to provide a pickup tone arm free from the drawbacks of the prior art complex resonance type pickup tone arm.

It is another object of this invention to provide a pickup tone arm having a damping member disposed at its middle in which the arm is prevented from being bent down at its portion where the damping member is disposed.

It is a further object of this invention to provide a pickup tone arm having a suspension wire disposed at the center of a damping member provided in the middle of the arm for preventing its movement in its axial direction, in which the suspension wire is arranged at a position above the center line to prevent the arm from being bent down at a portion where the damping member is disposed.

It is a further another object of this invention to provide a pickup tone arm in which a plurality of damping members are provided for preventing the tone arm from being bent down at a portion where a damping member is disposed.

It is a still further object of this invention to provide a pickup tone arm in which the contact area of a damping member is made relatively great to prevent the tone arm from being bent down.

It is yet another object of this invention to provide a pickup tone arm with a plurality of damping members being provided therein in which the hardness of the damping members is changed to define the bend point.

It is yet a further object of this invention to provide a pickup tone arm in which a damping member is tapered to provide the same effect as that of damping members having different hardness, thereby defining its bend point.

The other objects, features and advantages of the present invention will be apparent from the following description taken in conjunction with the accompanying drawings.

BRIEF DESCRIPTION OF THE DRAWINGS

FIGS. 13 and 15 are side views, partially in vertical section, respectively showing an embodiment of a tone arm according to this invention, FIG. 14 is a side view of a tone arm used for explaining the operation of the embodiments shown in FIGS. 13 and 15, FIGS. 16 to 19, inclusive, are partial enlarged cross-sectional views respectively showing another embodiment of this invention.

DESCRIPTION OF THE PREFERRED EMBODIMENTS

In order to eliminate the above-mentioned drawbacks of the prior art, this invention is to provide a pickup tone arm such that a suspension wire is arranged above the axial center line passing through the pipe portion and the main holder portion with a damping material or damper 19 having proper hardness (soft) being used so as to prevent its divided resonance.

Figure 6:
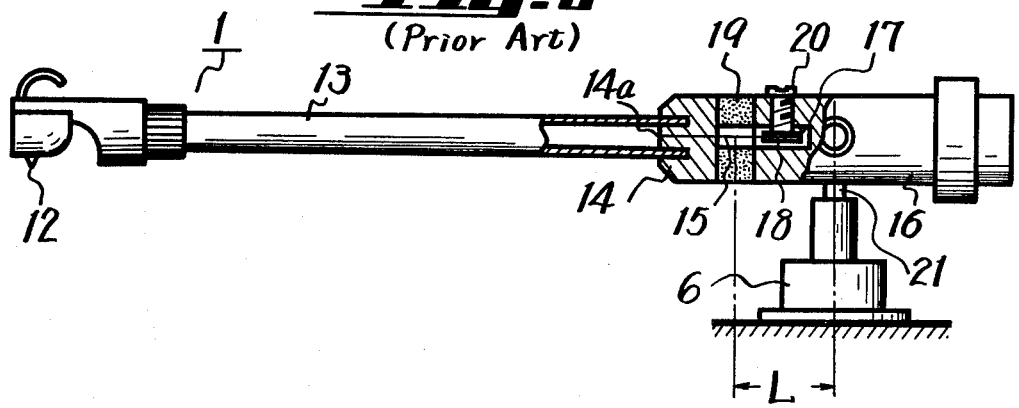
FIG. 6 is a side view, partially in vertical section, showing one example of a practical construction of the prior art tone arm.
Figure 7:
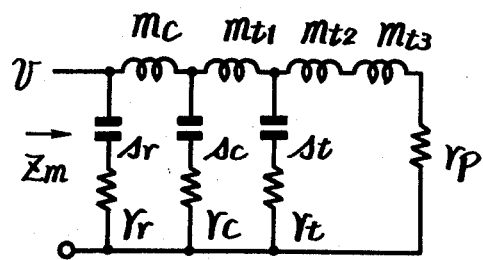
FIG. 7 is a view showing an electric equivalent circuit of the tone arm shown in FIG. 6.
Figure 8:
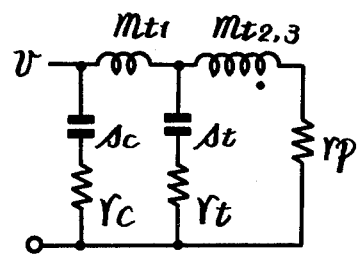
FIG. 8 is a view showing a simplified equivalent circuit of FIG. 7.
Figure 9:
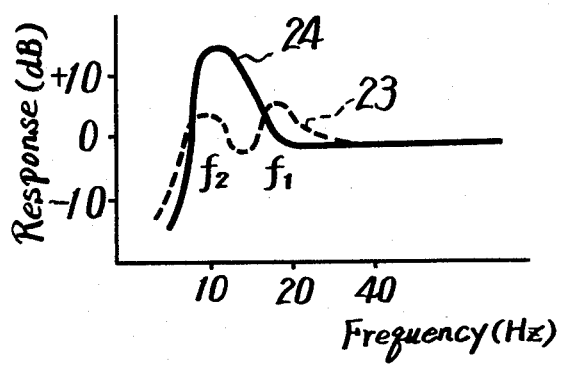
FIG. 9 is a graph showing low frequency characteristics of the prior art tone arm.
Figure 10:
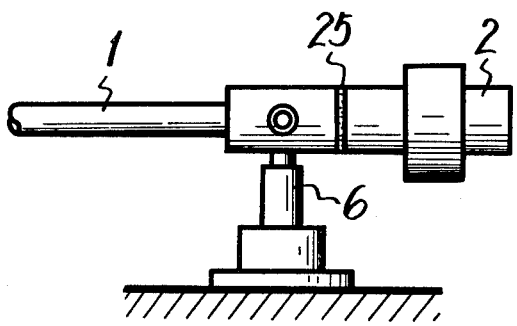
FIGS. 10 and 11 are side views respectively showing a prior art tone arm.
Figure 11:
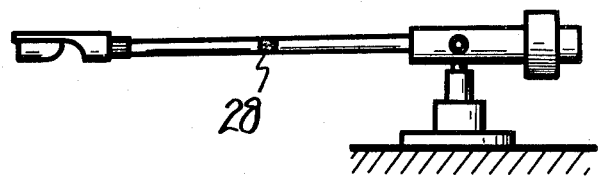

A description will hereinafter be given of an embodiment of this invention with reference to FIGS. 13 and 14 in which reference numerals corresponding to those of FIGS. 6 and 12 designate similar elements with their description is omitted. In FIG. 13, the damper 19 being positioned back of the fulcrum of the base 6, and the suspension wire 15 is disposed above the axial center $L_C$ of the pipe 13, the pipe holder 14 and the main holder portion 16. With the construction described above, when the stretching force of the suspension wire 15 is increased by adjusting the set screw 20, the tone arm pipe 13 will be bent upwards as shown in FIG. 14. Therefore, if the stretching force is properly adjusted so as to make the pipe 13 straight, a damping member having relatively low hardness can be used as the damper 19.

Figure 12:
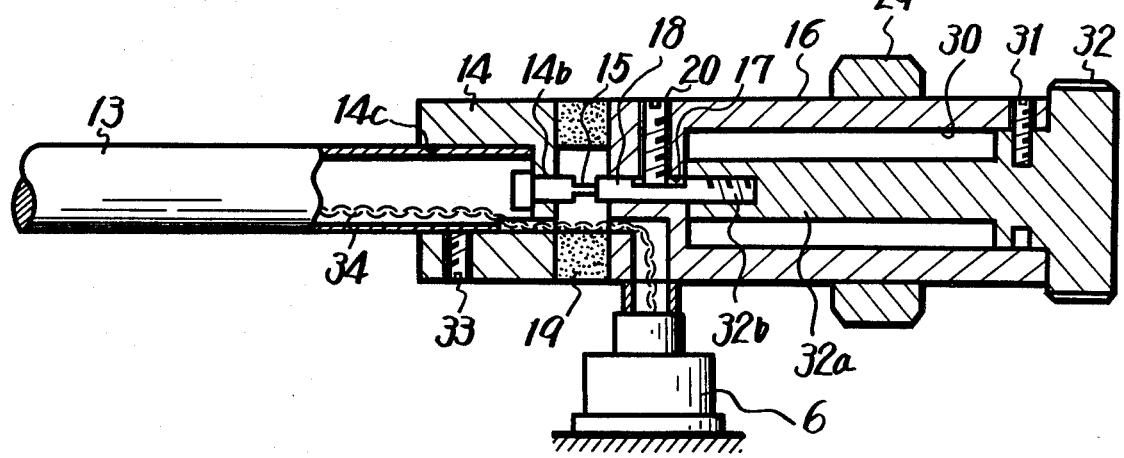
FIG. 12 is a side view, partially in vertical section, showing another example of a prior art tone arm used for easy understanding of this invention.

FIG. 15 illustrates another embodiment of this invention, in which the damper 19 is provided before the fulcrum of the base 6 and the other elements are the same as those of FIGS. 12 and 13 excepting that the suspension wire 15 which is practically arranged above the center line $L_C$ by a distance of 2 mm so that the hardness of the damper 19 can be lowered to H 20°. The hardness of the damper 19 in the prior art examples is in a range between H 60° and H 70°. Therefore, as compared with the prior art, the resonance frequency characteristics of this tone arm could also be greatly improved as shown by a curve (35) of FIG. 5. In this case, it is favorable that the center of the bend point is clearly defined in a portion of the damper 19. It is to be noted that the damper 19 is formed with an opening through which a wire 15 extends.

Figure 17:
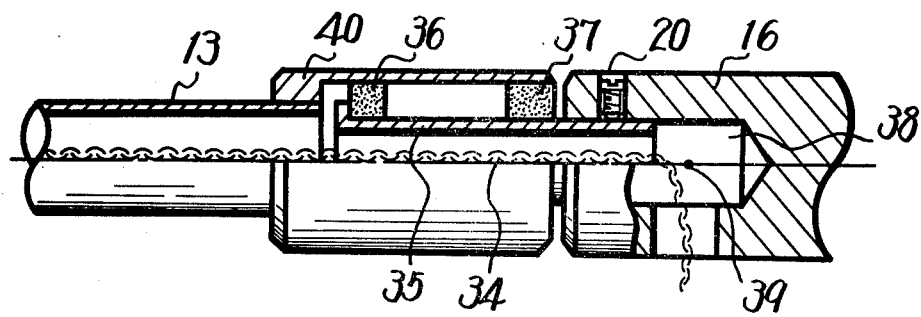

In FIGS. 16 and 17, a damping member is divided into plural portions. In FIG. 16, an auxiliary pipe 35 is engageably inserted into the end portion of the pipe 13, while the main holder 16 is bored with a stepped facing aperture 38 at its end portion opposite to its balance weight portion and annular visco-elastic members 36 and 37 are engaged with the aforesaid stepped aperture 38. With the above arrangement, the auxiliary pipe 35 is inserted into the aperture 38 so as to engage its outer periphery with the inner peripheries of the visco-elastic members 36 and 37, and a cap-like member 40 is attached to the end portion of the main holder 16 to combine the damper 36, the pipe 13 and the main holder 16 into an integral form. Reference numeral 41 indicates a set screw and 39 a vertical rotation bearing position of the tone arm and also a horizontal rotation fulcrum position. In an embodiment of FIG. 17, the auxiliary pipe 35 is engageably inserted into the facing aperture 38 bored in the main holder 16 to fix it to the main holder 16 by the set screw 20. The tone arm pipe 13 is secured at its tip with the cap-like member 40 as an expanded portion so that the auxiliary pipe 35 is freely located therein and the visco-elastic members 36 and 37 are provided between the cap-like member 40 and the auxiliary pipe 35. The visco-elastic member 36 is preferably made of a visco-elastic material of relatively high hardness, for example, about H 70° and of relatively small thickness so as to be serve as the vibration fulcrum between the tone arm pipe 13 and the tone arm main holder 16. On the other hand, the visco-elastic member 37 is preferred to enhance its damping effect as compared with the visco-elastic member 36 with its hardness being selected as low as possible, for example, about H 20° from a structural point of view. Thus, the visco-elastic member 36 is served as the bend point between the pipe 13 and the main holder 16 to prevent its bending and also to define the bend point clearly. Meanwhile, it is also possible that the bend point is selected at the side of soft visco-elastic member 37.

Figure 18:
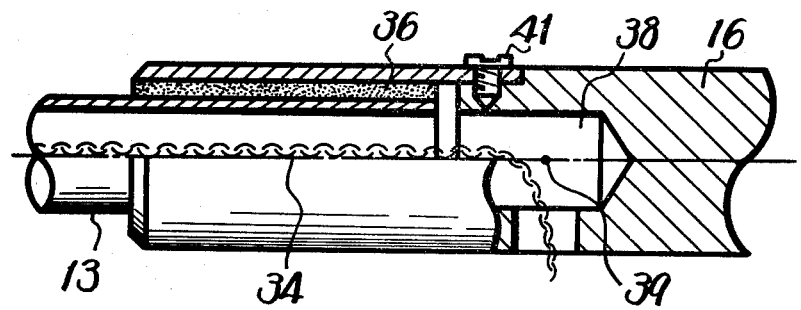
Figure 19:
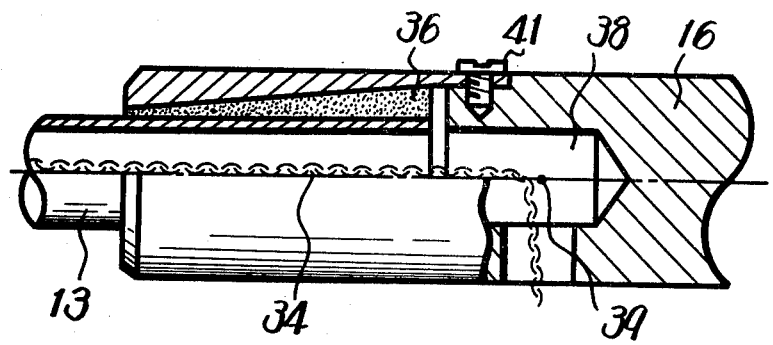
Figure 20:
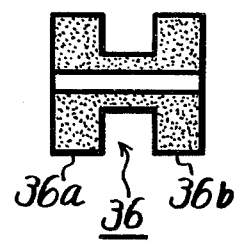
FIG. 20 is an enlarged cross-sectional view showing another embodiment of a damping member of this invention.

In FIGS. 18 and 19, the auxiliary pipe is not and the tone arm pipe 13 is directly inserted into the facing aperture 38 of the main holder 16 and a cylindrical visco-elastic member is provided between the tone arm pipe 13 and its main holder 16, and the damping visco-elastic member 36 is not divided into plural parts as in the above examples. In this case, the contact area between the pipe 13 and the main holder 16 is increased so that the pipe 13 can be entirely prevented from being bent down. In the embodiment of FIG. 19, the damper 36 is tapered in such a manner that its thickness is small at its pipe side and large at its main holder side, so that the vibration center is defined at the pipe side where the damper 36 is thin. It is apparent that the same effect as in the case of FIG. 19 can be obtained even when the thickness of the damper 36 is made large at the pipe side and small at the main holder side contrary to the example of FIG. 19, or when the hardness of the damper 36 is made different at the pipe side and at the main holder side in the embodiment of FIG. 18. It is also apparent that the damping member 36 can be integrally formed with two expanded portions 36a and 36b as shown in FIG. 20. Further, it is very easy for those skilled in the art to see that the damping adjustable means described in FIG. 12 can be combined with the embodiments of this invention.

Figure 1:
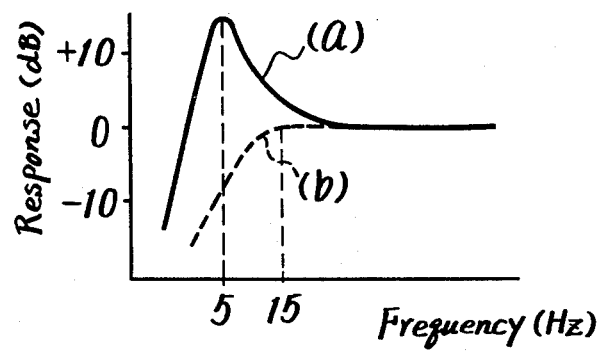
FIG. 1 is a graph showing low frequency characteristics used for explaining a tone arm.
Figure 2:
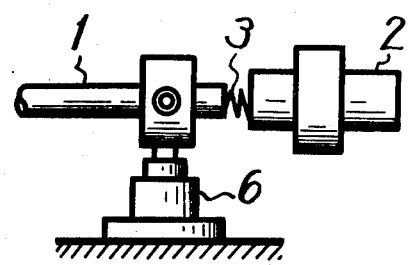
FIG. 2 is a schematic view used for explaining the theory of a prior art tone arm utilizing anti-resonance damping operation.
Figure 3:
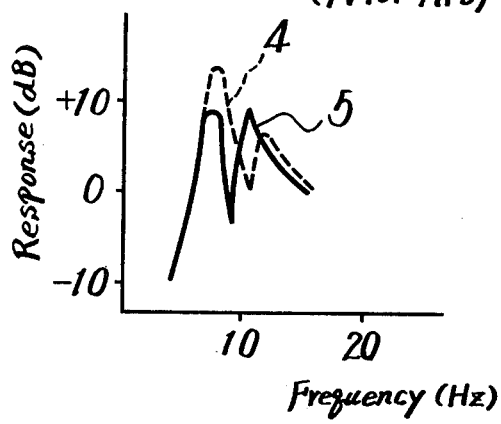
FIG. 3 is a graph showing frequency characteristics of the tone arm shown in FIG. 2.
Figure 4:
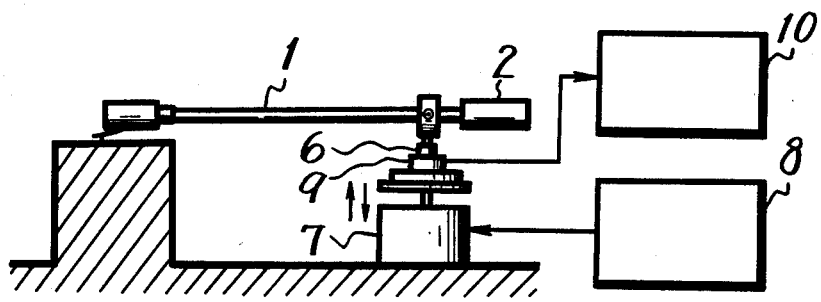
FIG. 4 is a schematic view showing a measuring system of a tone arm when it is driven from its base side for measuring middle resonance.
Figure 5:
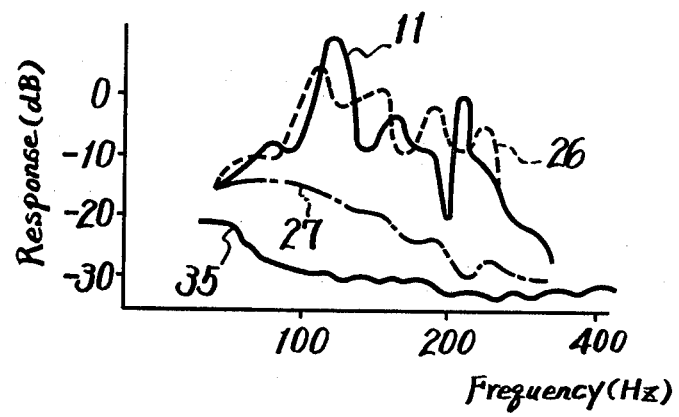
FIG. 5 is a graph showing vibration frequency characteristics of respective tone arms which are obtained by the measuring system of FIG. 4.

According to the above described construction of this invention, the same effect is obtained as if the pickup side is connected to the holder side through a mechanical filter having low cut-off frequency viewing from the holder side, so that the effect of decreasing the divided resonance of the tone arm itself to a great extent is quite remarkable over the wide frequency range as shown by the curve 35 of FIG. 5.

It will be apparent that a number of changes and variations can be effected without departing from the scope of the novel concepts of the present invention.

We claim as our invention:

1. A tone pickup arm comprising a main holder portion formed with a central opening, a hollow member with a stylus supported on one end, a hollow member holder into which the second end of said hollow member extends and said hollow member holder formed with a central opening, a damper member of visco-elastic material of generally cylindrical shape and formed with an opening mounted between said main holder portion and said hollow member holder in said central openings, and a suspension wire attached to said hollow member holder and to said main holder portion and said suspension wire mounted so as to pass through said opening in said damper member and so as to be vertically offset above the center line of said hollow member, said hollow member holder and said main holder portion.

2. A tone pickup arm according to claim 1 wherein said tone pickup arm is supported on horizontal and vertical axes which pass through said hollow member holder such that said damper member is on the side of said axes opposite said stylus.

3. A tone pickup arm according to claim 1 wherein said tone pickup arm is supported on vertical and horizontal axes which pass through main holder member such that said damper member is on the same side of said axis as said stylus.

4. A tone pickup arm according to claim 1 wherein said suspension wire is vertically offset from said center line about 2mm.

5. A tone pickup arm comprising, a main holder portion formed with a central opening, a stylus holder with a stylus at one end and its other end extending into said central opening of said main holder portion but not in contact with said main holder portion and damping material of visco-elastic material surrounding said stylus holder between said main body portion and said stylus holder, wherein said central opening is tapered so that it becomes smaller toward the end of said main holder into which said stylus holder extends and said damping material fills the space between said stylus holder and said tapered opening in said main holder.

6. A tone pickup arm comprising, a main holder portion formed with a central opening, a stylus holder with a stylus at one end and its other end extending into said central opening of said main holder portion but not in contact with said main holder portion and damping material of visco-elastic material surrounding said stylus holder between said main body portion and said stylus holder, wherein said damping material comprises a pair of spaced annular members mounted between said stylus holder and said main holder portion in said central opening and wherein one of said pair of spaced annular members is nearer the stylus of said stylus holder than the other annular members and has greater hardness than the other of said annular members.

7. A tone pickup arm according to claim 6 wherein said one annular member has a hardness of about H 70° and the other of said annular members has a hardness of about H 20°.

8. A tone pickup arm according to claim 6 wherein said one annular member has a hardness of about H70° and the other of said annular members has a hardness of about H 20°.

9. A tone pickup arm comprising, a main holder portion formed with a central opening, a stylus holder with a stylus at one end, a hollow cap mounted at the other end of said stylus holder, an auxiliary pipe mounted on the end of said main holder portion, said auxiliary pipe extending into said hollow cap but not in contact with said hollow cap and damping material of visco-elastic material between said hollow cap and said auxiliary pipe.

10. A tone pickup arm comprising, a main holder portion formed with a central opening, a stylus holder with a stylus at one end and its other end extending into said central opening of said main holder portion but not in contact with said main holder portion and damping material of visco-elastic material surrounding said stylus holder between said main body portion and said stylus holder, wherein said damping material comprises a pair of sapced annular members mounted between said stylus holder and said main holder portion in said central opening, and wherein one of said pair of spaced annular members is nearer the stylus of said stylus holder than the other annular members and has greater hardness than the other of said annular members.

* * * * *